(12) United States Patent
Garcia et al.

(10) Patent No.: US 7,058,736 B2
(45) Date of Patent: *Jun. 6, 2006

(54) REORDERING OF BURST DATA TRANSFERS ACROSS A HOST BRIDGE

(75) Inventors: Serafin E. Garcia, Folsom, CA (US); Russell W. Dyer, El Dorado Hills, CA (US); Abdul H. Pasha, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 10/292,031

(22) Filed: Nov. 11, 2002

(65) Prior Publication Data

US 2003/0070009 A1 Apr. 10, 2003

Related U.S. Application Data

(63) Continuation of application No. 09/384,128, filed on Aug. 27, 1999, now Pat. No. 6,505,259.

(51) Int. Cl.
*G06F 13/00* (2006.01)

(52) U.S. Cl. .............................. 710/35; 710/20; 710/52; 710/66; 711/169

(58) Field of Classification Search .................. 710/20, 710/35, 52, 66; 711/169
See application file for complete search history.

(56) References Cited

U.S. PATENT DOCUMENTS

| | | | | |
|---|---|---|---|---|
| 4,307,461 A | * | 12/1981 | Brickman et al. | 379/269 |
| 4,328,543 A | * | 5/1982 | Brickman et al. | 710/316 |
| 5,255,378 A | | 10/1993 | Crawford et al. | |
| 5,640,517 A | | 6/1997 | Parks et al. | |
| 5,696,917 A | | 12/1997 | Mills et al. | |
| 5,715,476 A | | 2/1998 | Kundu et al. | |
| 5,784,705 A | | 7/1998 | Leung | |
| 5,835,970 A | | 11/1998 | Landry et al. | |
| 5,898,857 A | | 4/1999 | Beaman et al. | |
| 5,918,072 A | | 6/1999 | Bhattacharya | |
| 6,026,465 A | | 2/2000 | Mills et al. | |
| 6,178,467 B1 | | 1/2001 | Faucher et al. | |
| 6,223,266 B1 | | 4/2001 | Sartore | |
| 6,292,651 B1 | * | 9/2001 | Dapper et al. | 725/106 |
| 6,418,558 B1 | * | 7/2002 | Roberts et al. | 725/129 |

* cited by examiner

*Primary Examiner*—Jeffrey Gaffin
*Assistant Examiner*—Alan S. Chen
(74) *Attorney, Agent, or Firm*—Blakely, Sokoloff, Taylor & Zafman LLP

(57) ABSTRACT

A method includes reordering a non-linear burst transaction initiated by a processor targeting a peripheral bus to a linear order, and retrieving the linear burst from the peripheral bus.

18 Claims, 3 Drawing Sheets

REORDERING OF BURST DATA TRANSFERS ACROSS A HOST BRIDGE

CROSS-REFERENCE TO RELATED APPLICATION

The application is a Continuation of application Ser. No. 09/384,128, filed Aug. 27, 1999 now U.S. Pat. No. 6,505,259, by applicants, Serafin E. Garcia, Russell W. Dwyer and Abdul H. Pasah, entitled "Reordering of Burst Data Transfers Across a Host Bridge."

FIELD OF THE INVENTION

The invention relates to microprocessor communications and, more particularly, to communications about a bridge chip set.

BACKGROUND OF THE INVENTION

Computer systems generally provide a bus that enables communication between computer system components such as a central processing unit (CPU) and a memory. Such a bus may be referred to a system bus, a memory bus, or a host bus. Computer systems generally also include one or more secondary or peripheral buses. Such peripheral buses typically enable communication to various devices, such as input/output devices, of the computer system. The peripheral buses are typically standardized and enable the connection of various types of devices or agents to the computer system.

Typical peripheral standardized buses include the Peripheral Component Interconnect (PCI) bus or bridge that links devices or agents such as video devices, disk drives, and other adapter cards. A second bus often used in connection with a PCI bus in modern computer systems is the Accelerated Graphics Port (AGP). AGP is an interface specification generally designed for the throughput demands of 3-D graphics.

Communication protocol between a processor and peripheral devices or agents about a peripheral bus generally allows the transfer of chunks of data of 8 bytes or less. Such chunks represent a quad word. In addition to quad words, communication protocols also allow the transfer of data as four quad words or 32 bytes. Such a transfer is referred to as a cache line or burst. A cache line or burst transfer is typically faster than a transfer of four individual quad words of the same data, because the transfer of a burst allows compacting of the data.

When a processor reads memory, the processor requests a section of address space in memory. That address space may typically be represented by a quad word. Typically, what the processor receives in response to its request is a cache line or burst that includes the requested quad word. The burst order refers to the choice of addresses for the sequence of a burst or cache line. In modern systems, the receipt of a burst does not necessarily correspond to the sequentially ordered quad words that make up the burst in memory space. Instead, the line is returned with the requested quad word first, followed by the remaining quad words toggled in a non-linear fashion as known in the art.

The above description related to a processor requesting data from memory over, for example, a memory bus. The same communication protocol is followed when a processor requests data from a peripheral device or agent. Data returned to a processor as part of a read transaction initiated by the processor is returned as a burst or cache line that may or may not represent a sequential transfer of data from a cache line or burst. One problem is systems that utilize a PCI bus as a communication link between the peripheral device or agent and the processor is that PCI generally only understands sequential or linear ordering. Thus, a non-sequential or non-linear burst transaction initiated by a processor is returned to the processor as four distinct requests for data (four quad words). Thus, the efficiency of the system is limited by PCI's inability to transfer continuous bursts of data in non-linear order.

SUMMARY OF THE INVENTION

A method and apparatus is disclosed. In one aspect, the method includes reordering a non-linear burst transaction initiated by a processor targeting a peripheral bus to a linear order, and retrieving the linear burst from the peripheral bus.

DETAILED DESCRIPTION

A method and apparatus of reordering burst data transfers are disclosed. The reordering is used for, in one aspect, in presenting non-linear read transaction requests to a peripheral bus, such as AGP or PCI, as a linear request.

Figure 1:
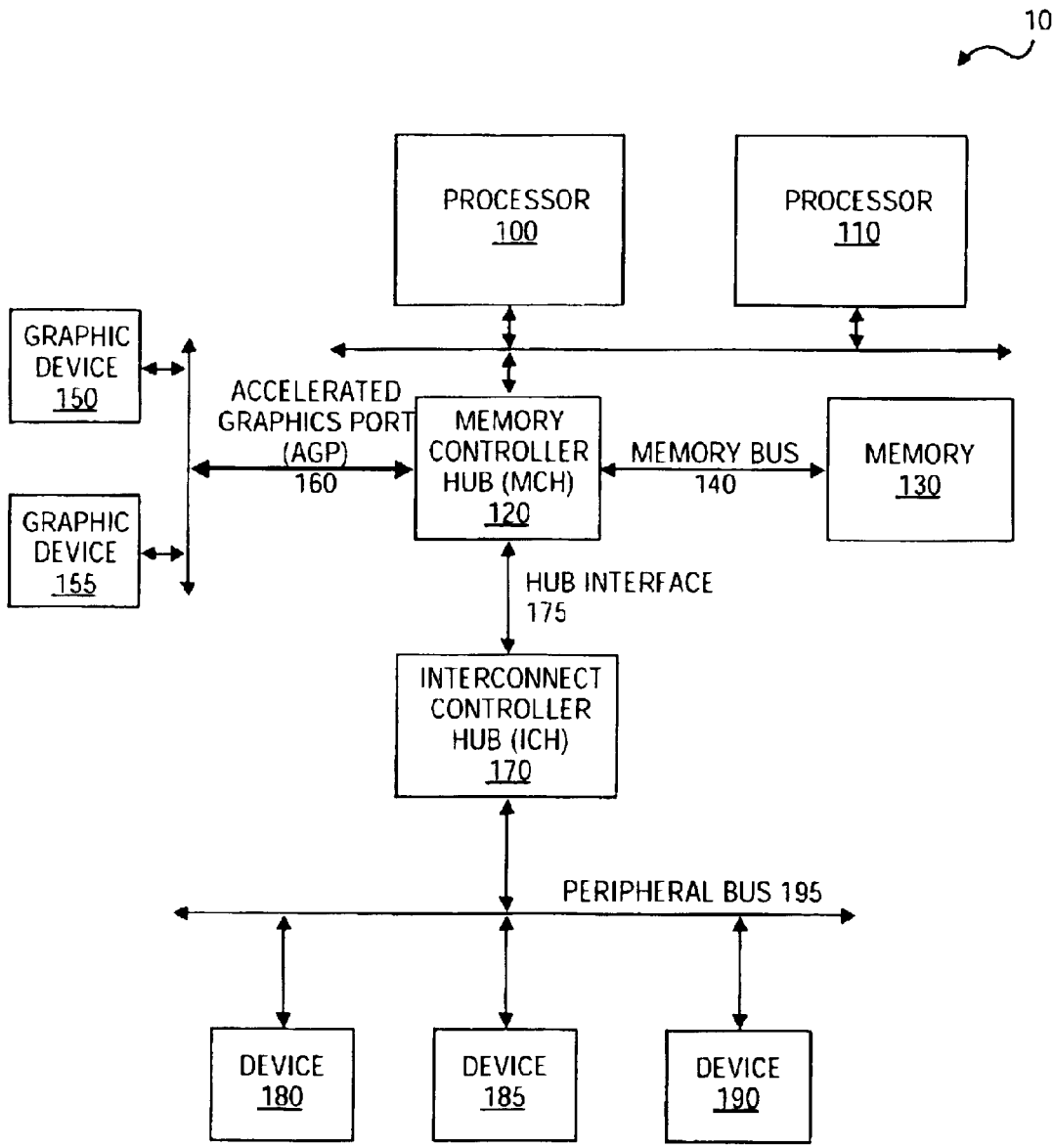
FIG. 1 illustrates a computer system including a processor and a main memory bus along with devices and agents coupled to peripheral buses and corresponding bridge circuits.

FIG. 1 illustrates a computer system incorporating the transfer method of an embodiment of the invention in general block diagram form. Computer system 10 includes processor 100 (and optionally processor 110 and other processors) coupled to memory controller hub (MCH) 120. In one aspect, MCH 120 controls the accessing of memory 130 over memory bus 140. In this example, also coupled to MCH 120 is accelerated graphics port (AGP) 160 to communicate chiefly with advanced video and other graphic devices 150 and 155.

In FIG. 1, MCH 120 is coupled to interconnect controller hub (ICH) 170 over hub interface 175. ICH 170 generally translates hub interface protocol into a second protocol for peripheral bus 195, such as a PCI bus. In the example, peripheral bus 195 links various devices, including video, disk drive and other adapter cards to MCH 120 through ICH 170.

In the following example, a processor read transaction will be described. In one example, a line transfer reads or writes a cache line or burst. On a processor such as a Pentium® Pro processor, commercially available from Intel Corporation of Santa Clara, Calif., a cache line or burst is 32 bytes aligned on a 32-byte boundary. As noted above, while a line is always aligned on a 32-byte boundary, a line transfer need not begin on that boundary. A cache line or burst is transferred in four 8-byte chunks or quad words, each of which can be identified by a certain address bit. Table 1 illustrates an exemplary transfer order used for a 32-byte line, based on address bits A[4:3]# specified in a transaction Request Phase.

TABLE 1

Burst Order Used for Processor Bus Line Transfers

| A [4:3] # (binary) | Requested Address (hex) | 1st Address Transferred (hex) | 2nd Address Transferred (hex) | 3rd Address Transferred (hex) | 4th Address Transferred (hex) |
|---|---|---|---|---|---|
| 00 | 0 | 0 | 8 | 10 | 18 |
| 01 | 8 | 8 | 0 | 18 | 10 |
| 10 | 10 | 10 | 18 | 0 | 8 |
| 11 | 18 | 18 | 10 | 8 | 0 |

When a processor initiates a read transaction, the address of the request is provided to, for example, MCH. The lower bits of that address (e.g., bits 3 and 4) determine whether the transaction is linear or non-linear. In the example illustrated in Table 1, the burst order implied when A[4:3]# is 00b shall be referred to as linear and all other burst order shall be referred to as non-linear.

Figure 2:
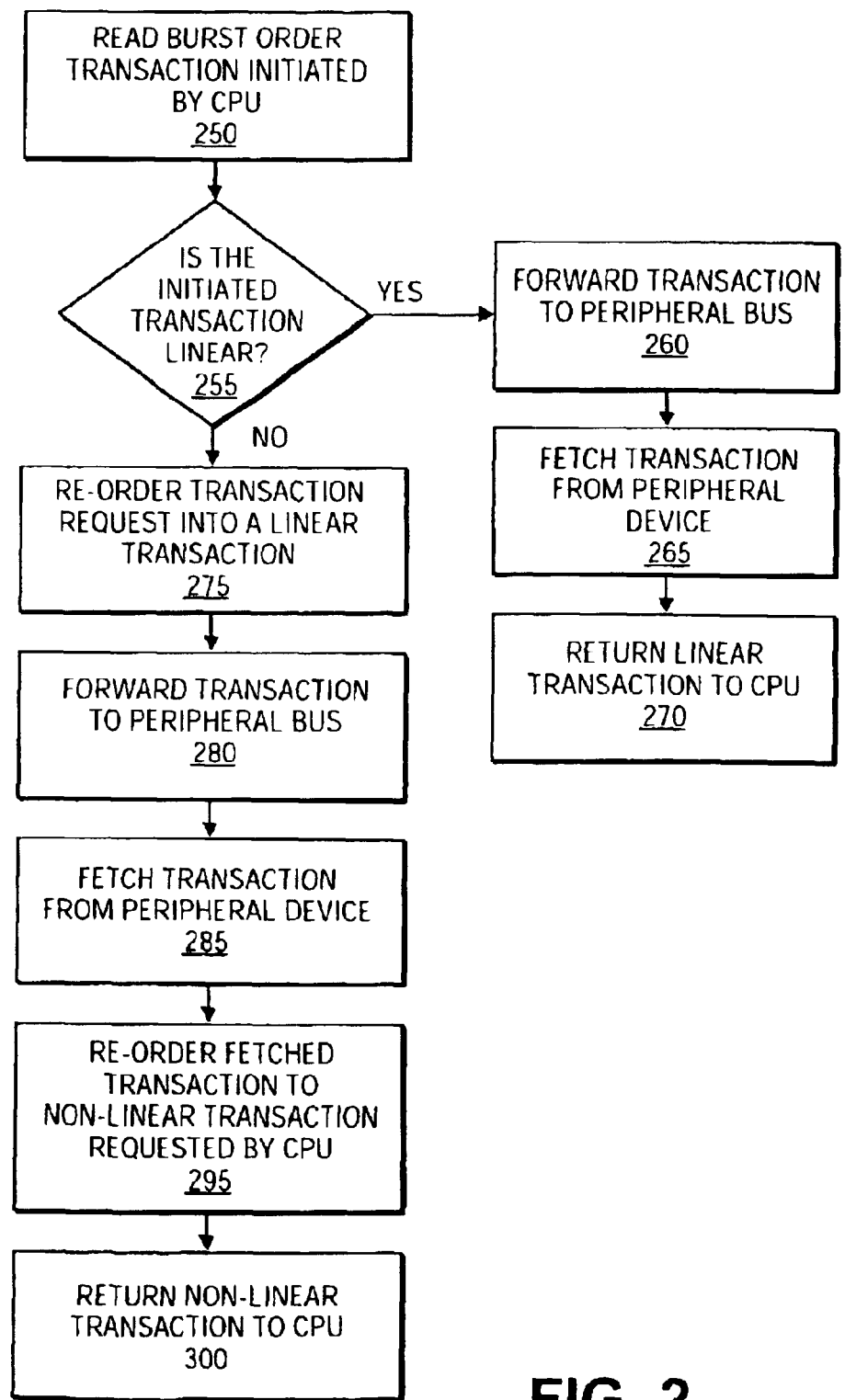
FIG. 2 is a flow diagram of an embodiment of the method of the invention.

Referring to FIG. 2, as a starting point, processor 100 initiates a read transaction requesting a line transfer over peripheral bus 195, such as a PCI bus (block 250). In one embodiment, the transaction proceeds to MCH 120 where the transaction is evaluated to determine whether the transaction is linear or non-linear (block 255). If the transaction is linear, such as when A[4:3]# is 00b, the transaction is forwarded to ICH 170 and peripheral bus 195 (block 260). The transaction (e.g., line transfer) is fetched from the appropriate peripheral device (device 180, device 185, device 190) (block 255) and returned as a linear transaction to MCH 120 and processor 100 (block 270).

When processor 100 initiates a non-linear transaction request targeting a peripheral bus, corresponding, for example, to an A[4:3]# of 01b, 10b, or 11b, MCH 120 replaces A[4:3]# with 00b prior to forwarding the transaction to peripheral bus 195. Once the starting address is modified, the transaction is initiated on peripheral bus 195 to allow a configured, linear, 32-byte burst read to occur on peripheral bus 195 (block 285).

In one embodiment, the entire line of read data is received from peripheral device or agent 180, 185, or 190 by MCH 120 in linear order and stored at MCH 120 (block 285). MCH 120 utilizes, for example, a line-size buffer to store the data. MCH 120 replaces A[4:3]# with the appropriate non-linear address request (01b, 10b, or 11b) corresponding to the transaction initiated by CPU 100 (block 295). The line of read data is then forwarded from MCH 120 to processor 100 in the order prescribed by the initiated transaction.

Figure 3:
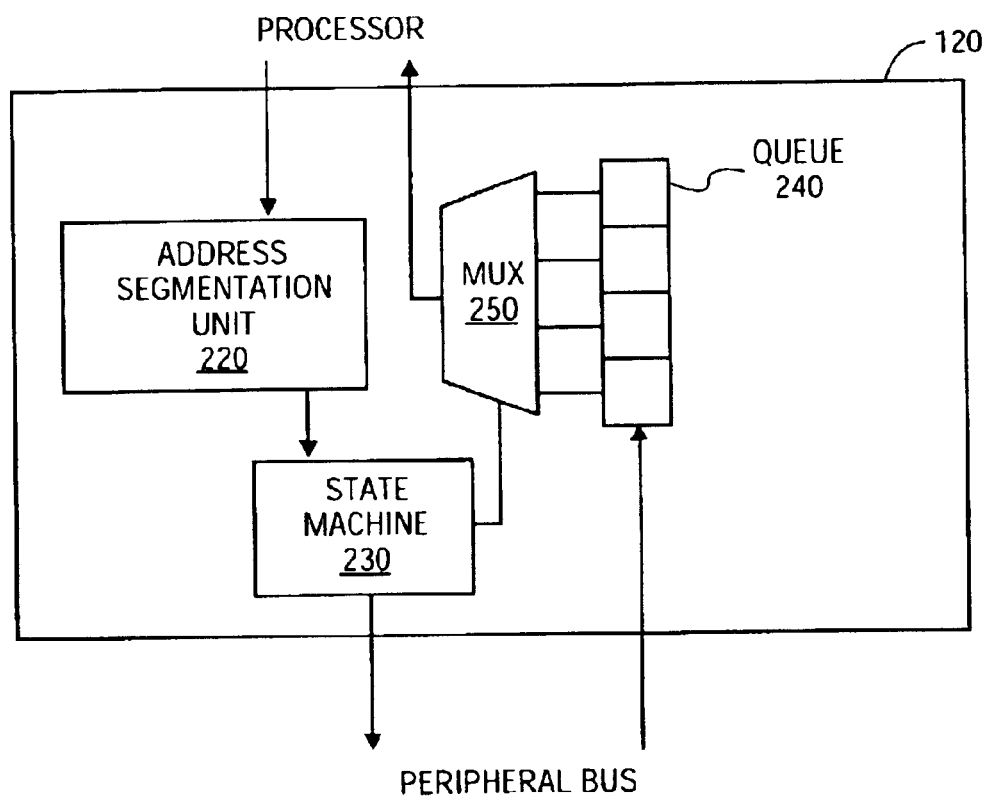
FIG. 3 illustrates a bridge circuit coupled between a processor and a peripheral bus suitable for use in an embodiment of the invention.

In the above embodiment, MCH 120 modifies the non-linear transaction request initiated by the processor to a linear request and modifies the retrieved line of read data from a linear order to a non-linear order prior to forwarding the data to processor 100. FIG. 3 illustrates an example of configuring MCH 120 to handle the modification of the transaction request and the line of read data. In this embodiment, the read transaction request initiated by processor 110 is presented to MCH 120. MCH 120 includes, for example, address segmentation unit 220 that captures and stores the lower bits of the address request (e.g., bits 3 and 4) that determine whether the request is linear or non-linear. Address segmentation unit 220 includes, for example, a register to store the lower bits of a transaction request. With the lower bits removed, MCH 120 treats the transaction request as linear and forwards the transaction to peripheral bus 195.

FIG. 3 also shows queue 240 to receive an entire line of read data from agent or device 180, 185, or 190. In one example, queue 240 is a line-size buffer. As noted above, address segmentation unit 220 stores the address bits for ordering the line of read data according to the transaction requested by processor 100. Once the entire line of read data is present in queue 240, steering logic, for example, in state machine 230 is employed to reconfigure data based on the address transaction requested. If the transaction requested was a linear line read (e.g., A[4:3]# is 00b), the read data is returned as linear line data. Conversely, if the transaction requested is a non-linear line read (e.g., A[4:3]# is 01b, 10b, or 11b), the configuring address is associated with the read data and the data returned as non-linear line data. One way this modification may be done is by utilizing multiplexer 250 coupled to queue 240 and controlling the output to processor 100. For example, a state machine may be utilized such that when a transaction is linear, multiplexor 250 does not reorder the line data. When the transaction is non-linear, state machine 230 utilizes mutliplexer 250 to reorder the line data prior to forwarding to the processor.

In the above example, MCH 120 is utilized to reorder transactions between a processor and a peripheral bus. In the illustration described with respect to FIG. 1, MCH 120 is a suitable choice for handling the reordering mechanism of the invention, because MCH 120 is linked both to peripheral bus 195 and AGP 160 allowing the invention to be implemented with respect to both buses. It is to be appreciated that the reordering mechanism can also be implemented in ICH 170 rather than MCH 120 or in combination with MCH 120.

The above example is described with reference to a peripheral bus that is a PCI bus. The same method can be used to control transactions between, for example, a processor and AGP or other peripheral bus, including in conjunction with transactions between the processor and a PCI bus.

In another embodiment, the functionality of the described embodiment of the MCH to reorder transactions between a processor and a peripheral bus may be implemented by a programmed second processor. In such case, there may be a machine-readable storage media containing executable program instructions that, when executed, cause the second processor to perform a method of reordering a non-linear burst transaction initiated by an initiating processor targeting a peripheral bus to a linear order and retrieving the linear burst from the peripheral bus. The program instructions may further include instructions for the second processor to perform the returning of the linear burst to the initiating processor as the initiated non-linear burst.

By reordering a transaction, the invention offers improved performance of transactions over buses that are not suited for non-linear cache line contiguous transfers. The invention allows requested non-linear cache lines or bursts to be transferred across secondary buses as linear cache lines or bursts thus reducing the design complexity of prior art systems that break the burst into smaller chunks of data.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:

reordering a non-linear burst transaction initiated by a processor targeting a peripheral bus to a linear order;

retrieving the linear burst from the peripheral bus; and returning the initiated non-linear burst to the processor;

wherein an interconnect controller hub (ICH) reorders the non-linear burst initiated by the processor and retrieves the linear burst transaction before returning the transaction to the processor as a non-linear burst.

2. The method of claim 1, further comprising: returning the linear burst to the processor as the initiated non-linear burst.

3. A method comprising:

receiving a non-linear burst transaction request initiated by at least one processor targeting a peripheral bus;

reordering the initiated non-linear burst transaction request to a linear order burst transaction request to retrieve data linearly on the peripheral bus;

retrieving a linear order burst transaction from the peripheral bus corresponding to the linear order burst transaction request; and returning the linear order burst transaction to the at least one processor as a non-linear burst transaction corresponding to a non-linear order of the initiated non-linear burst transaction request initiated by the at least one processor;

wherein one of an interconnect controller hub (ICH) and a memory controller hub (MCH) reorders the initiated non-linear burst transaction request to a linear order burst transaction request, retrieves the linear order burst transaction, and returns the non-linear burst transaction to the at least one processor.

4. The method of claim 3, wherein the returning the linear order burst transaction to the at least one processor as a non-linear burst transaction occurs after retrieving the linear order burst transaction from the peripheral bus.

5. The method of claim 3, further comprising one of an interconnect controller hub (ICH) and a memory controller hub (MCH) reordering the retrieved linear order burst transaction to a non-linear burst transaction having a transaction order corresponding to the initiated non-linear burst transaction request before returning the linear order burst transaction to the at least one processor as the non-linear burst transaction.

6. The method of claim 3, wherein reordering the initiated non-linear burst transaction request to a linear order burst transaction request comprises replacing a set of non-linear burst transaction request addresses corresponding to the initiated non-linear burst transaction request with a set of linear order burst transaction request addresses corresponding to the linear order burst transaction request, and wherein returning the linear order burst transaction to the at least one processor as a non-linear burst transaction comprises replacing the set of linear order burst transaction addresses corresponding to the linear order burst transaction received with the set of non-linear burst transaction addresses corresponding to the initiated non-linear burst transaction request.

7. An apparatus comprising:

at least one processor including circuitry for initiating a non-linear burst transaction request;

a bus bridge comprising one of an interconnect controller hub (ICH) and a memory controller hub (MCH) coupled to the at least one processor including circuitry for converting the non-linear burst transaction request to a linear order burst transaction request, wherein the bus bridge comprises:

a queue to receive a linear order burst transaction corresponding to the linear order burst transaction request;

a multiplexor having select inputs coupled to the queue; and a state machine coupled to the multiplexor to control the select inputs to the queue; and a peripheral bus coupled to the bus bridge including circuitry for receiving the linear order burst transaction.

8. The apparatus of claim 7, wherein the bus bridge includes circuitry for reordering the linear order burst transaction to a non-linear burst transaction corresponding to the initiated non-linear burst transaction request initiated by the at least one processor.

9. The apparatus of claim 7, wherein the bus bridge comprises a queue for retrieving the linear order burst transaction from the peripheral bus and circuitry for returning the linear order burst transaction to the at least one processor according to the initiated non-linear burst transaction request.

10. The apparatus of claim 7, wherein the bus is selected from the group consisting of an Accelerated Graphics Port (AGP) and a Peripheral Component Interconnect (PCI) bus.

11. The apparatus of claim 7, wherein the state machine comprises steering to reconfigure the linear order burst transaction to a non-linear burst transaction corresponding to the non-linear order of the initiated a non-linear burst transaction request.

12. The apparatus of claim 7, wherein the non linear burst transaction request initiated by the at least one processor is a configured non-linear burst read transaction comprising a plurality of words.

13. The apparatus of claim 12, wherein the non linear burst transaction request initiated by the at least one processor comprises a configured non-linear 32-byte burst read transaction to occur on the peripheral bus having four 8-byte quad words, each identified by a certain address bit, wherein the linear order burst transaction request comprises a configured linear 32-byte burst read transaction having four 8-byte quad words, each identified by a certain address bit; and wherein the queue comprises a 32-byte line size buffer to receive the linear order burst transaction.

14. The apparatus of claim 7, wherein the linear order burst transaction request is a configured linear order burst read transaction comprising a plurality of words.

15. A machine readable storage media containing executable computer program instructions which when executed cause at least one digital processing system to perform a method comprising:

reordering a non-linear burst transaction initiated by at least one processor targeting a bus to a linear burst order;

retrieving the linear burst order from the bus; and returning the linear burst order to the at least one processor as the initiated non-linear burst;

wherein one of an interconnect controller hub (ICR) and a memory controller hub (MCH) re-orders the non-linear burst initiated by the at least one processor and retrieves the linear burst order transaction before returning the transaction to the at least one processor as a non-linear burst.

16. The machine readable storage media containing executable computer program instructions of claim 15, further comprising:

executable computer program instructions which when executed cause at least one digital processing system to returning the linear burst transaction to the at least one processor as a non-linear burst transaction in accordance with the initiated non-linear burst transaction request.

17. The machine readable storage media containing executable computer program instructions of claim 15, wherein the non-linear burst transaction initiated by the at least one processor is a read transaction.

18. The machine readable storage media containing executable computer program instructions of claim 15, wherein the bus is selected from the group consisting of an Accelerated Graphics Port (AGP) and a Peripheral Component Interconnect (PCI) bus.

* * * * *